United States Patent [19]
Hazelden

[11] Patent Number: 5,636,137
[45] Date of Patent: Jun. 3, 1997

[54] OPTICAL TORQUE SENSOR INCORPORATING SENSOR FAILURE DIAGNOSTICS

[75] Inventor: Roger J. Hazelden, Worcestershire, England

[73] Assignee: Lucas Industries Public Limited Company, West Midlands, England

[21] Appl. No.: 289,345

[22] Filed: Aug. 11, 1994

[30] Foreign Application Priority Data

Aug. 13, 1993 [GB] United Kingdom ............... 9316841

[51] Int. Cl.$^6$ ............................................. B62D 5/00
[52] U.S. Cl. ........................... 364/507.444; 364/265; 364/266.2; 364/925.2; 318/640
[58] Field of Search ............... 73/862.41; 371/47.1, 371/48, 67.1, 72; 318/638, 640, 685; 364/183, 424.01, 424.05, 737, 262.2, 265, 266.2, 266.6, 925, 925.2, 943.9, 946.1, 507

[56] References Cited

U.S. PATENT DOCUMENTS

| | | | |
|---|---|---|---|
| 3,938,890 | 2/1976 | Flavell | 73/136 A |
| 4,637,264 | 1/1987 | Takahashi et al. | 73/862.33 |
| 4,871,039 | 10/1989 | Daido et al. | 180/79.1 |
| 4,887,682 | 12/1989 | Drutchas et al. | 364/424.05 |
| 5,285,390 | 2/1994 | Haseda et al. | 364/424.05 |

FOREIGN PATENT DOCUMENTS

| | | | |
|---|---|---|---|
| 0340172 | 4/1989 | European Pat. Off. | G01L 3/12 |
| 2118722 | 4/1971 | Germany | G01L 3/10 |
| 3508032 | 3/1985 | Germany | G01L 25/00 |

*Primary Examiner*—Emanuel T. Voeltz
*Assistant Examiner*—Craig Steven Miller
*Attorney, Agent, or Firm*—Christensen, O'Connor, Johnson & Kindness, PLLC

[57] ABSTRACT

An improved torque sensor, or relative angular movement sensor, comprises an input member, an output member, LED light sources, a pair of photodetector units adapted to receive light from the LED light sources, and signal processing means, in which said signal processing means is adapted to receive output signals from the photodetector units, the output signals of the photodetector units being dependent upon the light signals which they receive, and the signal processing means being adapted to process the output signals from the photodetector units so as to produce a modified output signal indicative of the relative angular displacement between, or torque applied between, the input and output member. The improvement comprises the provision of diagnostic means which continuously monitors a sum signal, $\Sigma$, which comprises the sum of the output signals from the photodetector units, and which detects any variation in the sum signal due to failure of the sensor.

19 Claims, 5 Drawing Sheets

OPTICAL TORQUE SENSOR INCORPORATING SENSOR FAILURE DIAGNOSTICS

BACKGROUND OF THE INVENTION

This invention relates to improvements in optical torque sensors especially, but not exclusively, for incorporation in power-assisted steering systems for vehicles.

In our European patent application No. 93300792.4, a torque sensor is described which comprises an input member, an output member, emitter means, first receiver means adapted to receive a first signal, second receiver means adapted to receive a second signal, and signal processing means, in which said signal processing means is adapted to receive output signals from the first and second receiver means, the output signals of the receiver means being dependent upon the first and second signals which they receive, and the signal processing means being adapted to process the output signals from the first and second receiver means so as to produce a modified output signal indicative of the relative angular displacement between, or torque applied between, the input and output member. A torque sensor of this type will hence forth be referred to as a torque sensor of the kind described.

A torque sensor of the kind described may be incorporated in a power-assisted steering system having an input column transmitting torque from a steering wheel to the input member of the torque sensor, and an output column transferring torque to a steering mechanism adapted to steer road wheels of the system. The modified output signal of the torque sensor may be used to control the operation of an electric steering motor adapted to steer the road wheels.

A highly desirable feature of any torque sensor is the facility for easy detection of partial or total failure of the sensor. This is vitally important in a safety critical application such as a vehicle steering system. If the sensor can be tested each time the system is switched on or off, or preferably continuously during operation, this allows a significant increase in the safety of the system, since the driver can be warned of the fault and the system returned to a safe state. An example of such a safe state would be to disable the power assistance in the steering system until the sensor has been replaced or repaired.

An aim of the present invention is to provide diagnostic means capable of detecting partial or total failure of a torque sensor of the kind described.

SUMMARY OF THE INVENTION

According to a first aspect the invention comprises a torque sensor having an input member, an output member, emitter means, first receiver means adapted to receive a first signal, second receiver means adapted to receive a second signal, and signal processing mean adapted to receive output signals from the first and second receiver means, the output signals from the receiver means being dependent upon the first and second signals which they receive, and the signal processing means being adapted to process the output signals from the first and second receiver means so as to produce a modified output signal indicative of the relative angular displacement between, or torque applied between, the input and output members, wherein diagnostic means is provided for continuously monitoring a sum signal comprising the sum of the output signals from the first and second receiver means, the diagnostic means being adapted to detect any variation in the sum signal due to failure of the sensor.

Preferably input and output masks are associated with the input and output members respectively, interposed between the emitter means and the first and second receiver means. Preferably, the masks each comprise an equi-angularly spaced set of apertures, the masks having equal aperture pitch, the aperture pitch being defined as the total angle subtended by one opaque and one transparent region of the mask. Preferably the input and output masks move angularly with the input and output members respectively.

If the sensor is functioning correctly there will be very little variation in the signal representing the sum of all the output signals from the first and second receiver means as the steering wheel is turned. However, should any part of the sensor fail it will cause a greatly increased variation, or ripple, in the sum signal as the masks move in front of the receiver means. Preferably the diagnostic means is adapted to monitor the amplitude of the ripple in the sum signal each time the steering wheel is moved.

Preferably, if the ripple amplitude increases beyond a preset limit, the diagnostic means interprets this as a failure of the sensor. Preferably the diagnostic means can detect various mechanical problems and electrical faults in the sensor, in addition to failure of emitter or receiver components. The diagnostic means may detect failure of the sensor due to, for example, loose masks, loose collimators or dirt in the sensor, or short circuits in the sensor electrical connections to ground.

Preferably the diagnostic means comprises signal processing means. The signal processing means preferably comprises an electronic control unit (ECU) incorporating a digital microprocessor, although alternatively it may comprise hard-wired analogue or digital circuitry.

Preferably each of the output signals from the first and second receiver means are converted from analogue to digital signals and the ECU sums all the output signals to produce the said sum signal.

The output signals may each be converted using a respective analogue to digital convertor. Alternatively, the output signals are multiplexed to a single analogue to digital convertor.

The sum signal may be passed through a low-pass filter in the digital microprocessor which removes any ripple on the signal to leave a steady signal. Preferably the signal processing means compares the steady signal with a preset reference signal and if the value of the steady signal falls below the value of the preset reference signal, a signal denoting a fault is generated by the signal processing means.

Preferably the sum signal is also passed through a high-pass filter which outputs a signal representing the ripple on the sum signal. Preferably the processing means measures the ripple amplitude and compares it with a preset value. Preferably if the ripple amplitude increases above the preset value a fault is generated by the signal processing means.

The signal processing means may combine the two fault signals to produce a combined fault signal.

According to an alternative embodiment, a first aspect of the invention comprises a torque sensor comprising an input member, an output member, emitter means, first receiver means adapted to receive a first signal, second receiver means adapted to receive a second signal, and signal processing means adapted to receive output signals from the first and second receiver means, the output signals from the receiver means being dependent upon the first and second signals which they receive, and the signal processing means being adapted to process the output signals from the first and second receiver means so as to produce a modified output signal indicative of the relative angular displacement between, or torque applied between, the input and output members, wherein diagnostic means is provided for continuously monitoring any ripple in the modified output signal of the sensor, the diagnostic means being adapted to detect variation in the ripple amplitude due to failure of the sensor.

According to a second aspect the invention comprises a power-assisted steering system having an improved torque sensor according to the first aspect of the invention, an input column transmitting torque from a steering wheel to the input member of the torque sensor, and an output column transferring torque to a steering mechanism adapted to steer road wheels of the system.

Preferably, if a fault signal is generated by the diagnostic means, the ECU disables the power-assistance in the steering system, thus returning the steering system to a safe condition.

According to a third aspect the invention comprises a power assisted steering system according to the second aspect of the invention wherein the diagnostic means of the improved torque sensor is further adapted to test the emitter means and/or the first receiver means and/or the second receiver means for failure when the sensor is switched on and/or when the sensor is switched off.

The emitter means may comprise more than one effective emitter and preferably the ECU is adapted to enable each effective emitter to be activated individually when the sensor is switched on and off. Preferably, if no signal is received by either of the first and second receiver means when a single effective emitter is activated, the ECU generates a fault signal.

The first and second receiver means may each comprise more than one effective receiver respectively. Preferably the ECU is also adapted to generate individual pulses to activate briefly each effective receiver individually when the sensor is switched on or off. Preferably, if no signal is received by a particular effective receiver when all the effective emitters are activated, then the ECU generates a fault signal.

According to a fourth aspect the invention comprises a power assisted steering system according to the third aspect of the invention wherein signal processing means are provided to generate a single pulse when the steering system is switched on and/or switched off which momentarily activates a steering motor of the steering system to rotate the output column of the steering system to test the motor and/or a clutch and/or a gear box and/or the torque sensor of the steering system for failure.

Preferably the signal processing means is capable of generating a pulse which causes the motor to turn the output column in one direction and/or a pulse which causes the motor to turn in the other direction.

Preferably the steering motor, the clutch, the gearbox and the torque sensor are all attached to the output column of the steering system, with the clutch and gearbox positioned between the motor and the torque sensor. Preferably the diagnostic means is adapted to monitor the output signals from the torque sensor following the generation of a pulse, and to generate a fault signal if the value of the output signals of the torque sensor lie outside a preset range of values.

Preferably after the motor has been pulse activated to turn in one direction and the torque sensor output has been monitored, the motor is then pulse activated to turn in the other direction and the resulting torque sensor output is monitored in a similar manner.

When the effective receivers of the improved torque sensor are being tested individually as previously described it is possible that the input and output members of the torque sensor may happen to be positioned such as to totally obscure one detector, thus preventing a signal from being produced. Preferably the rotation of the output column in response to the generated signal pulse is great enough to ensure that every effective receiver is uncovered during at least part of the movement. This enables all the detectors to be checked without any of them being obscured.

Embodiments of the invention will now be described by way of example only with reference to the accompanying drawings in which.

DESCRIPTION OF THE PREFERRED EMBODIMENTS

Figure 1:
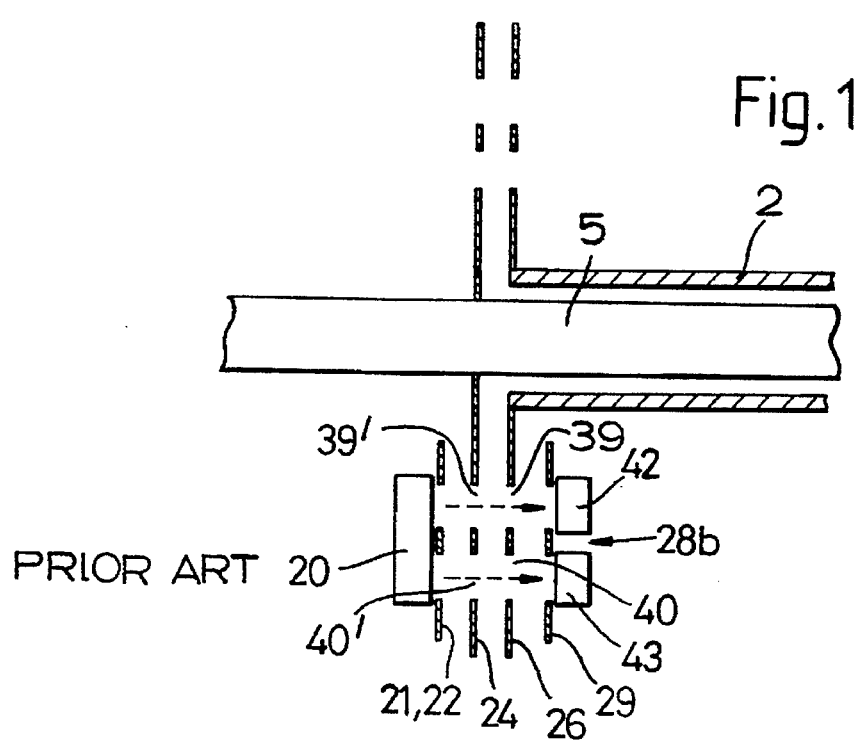
FIG. 1 shows schematically the principle behind an optical torque sensor of the kind described.
Figure 2:
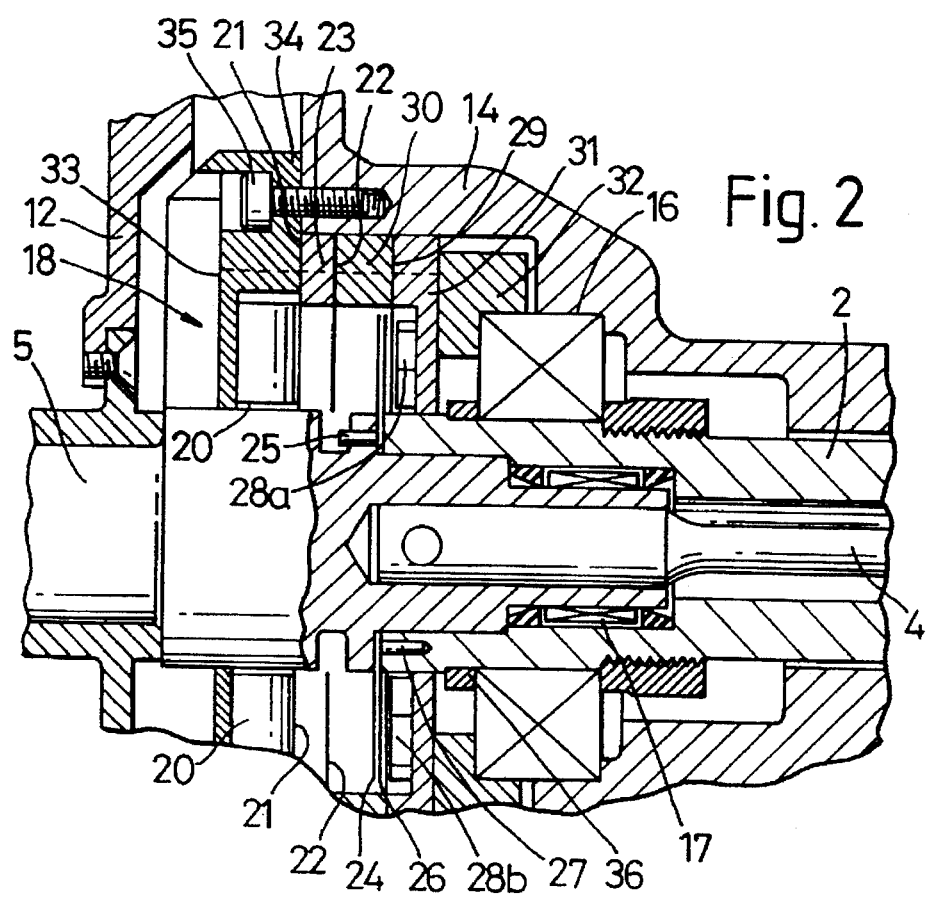
FIG. 2 is a schematic view of a power-assisted steering system for a vehicle.

An optical torque sensor 18 for incorporation in a Power-assisted steering system for a vehicle is shown schematically in FIG. 1 and is shown incorporated in a Power-assisted steering system for a vehicle in FIG. 2. The power-assisted steering system comprises a steering input shaft 2 coupled at one end to a steering wheel and at the other end to a torsion bar 4 which transmits steering torque to a steering output shaft 5. Input torque is applied to the input shaft 2 which moves angularly relative to the output shaft 5, due to the torsion bar twisting under the applied torque differential. The optical torque sensor 18 detects the relative angular movement between the input and output shafts and sends a signal indicative of the relative displacement to a control microprocessor. The microprocessor controls a motor so as to apply torque to the output shaft 5 in a sense such as to reduce the relative angular displacement between the input and output shafts. In addition the torque sensor can also be used to obtain the rate of rotation of the steering shaft 5 and the angular displacement of the steering shaft 5.

As shown schematically in FIG. 1 and FIG. 2, the torque sensor comprises two LED light sources 20 fixed relative to a housing 14; a pair of source collimator plates 21 and 22 associated with the light sources and also fixed relative to the housing 14; an annular spacer 23 provided between the source collimator plates 21 and 22; an output disc or mask 24 rigidly attached to the output shaft 5 by studs 25; an input disc or mask 26 rigidly attached to the input shaft 2 by studs 27, a pair of light detector units 28a and 28b fixed relative to the housing 14; a detector collimator 29 associated with the detectors units 28 and also fixed relative to the housing 14; an annular spacer 30 interposed between the detector collimator 29 and the source collimator 22; a detector-mounting dish member 31 upon which the detector units 28 are mounted; a packing member 32 provided between the mounting member 31 and the adjacent bearing 16; and an LED—mounting dish member 33 upon which the LED sources are mounted, the dish member 33 having lugs 34 by means of which it is clamped via screws 35 to the housing 14. A circlip 36 holds the bearing 16 in place.

Figure 3:
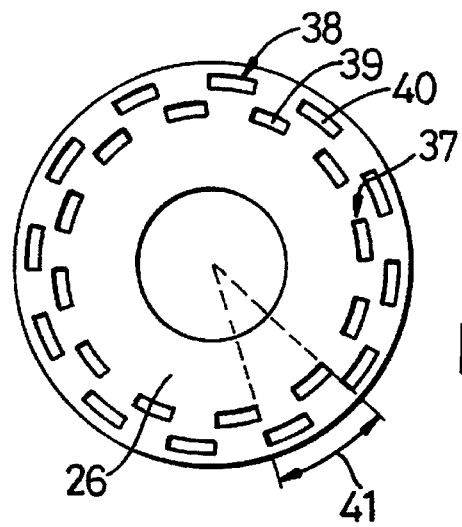
FIGS. 3 and 4 show respectively, input and output discs which comprise parts of the torque sensor of FIG. 1.

FIG. 3 shows a known arrangement of the input mask 26. The mask 26 is an annular disc having inner and outer rings 37 and 38 of circumferentially elongate apertures 39 and 40. The apertures 39 and 40 are equi-angularly spaced and have an angular pitch referenced 41. Each aperture subtends half a pitch at the central axis of the disc. The two rings 37 and 38 are angularly offset in antiphase with each other so that the apertures 39 of the inner ring are at the same angular positions as the opaque, blocking, regions of the outer ring.

Figure 4:
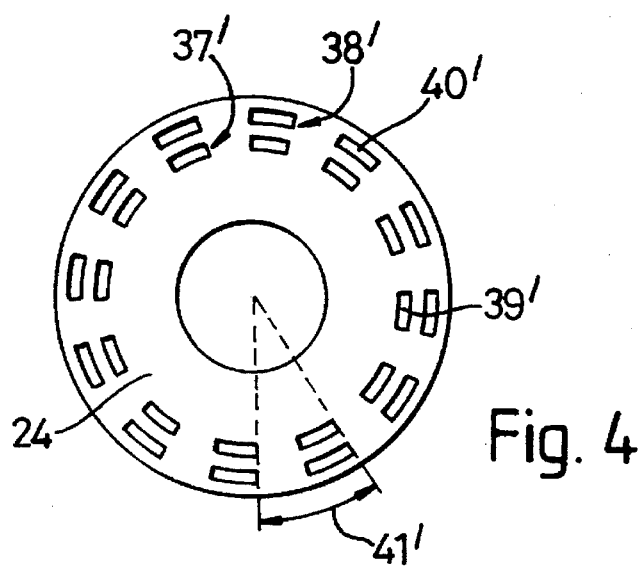

FIG. 4 shows the arrangement of the output mask 24 which is similar to that of the input mask 26 except that the apertures of the inner and outer rings are not offset, they are in phase with each other. The rings 38 and 38', and 39 and 39' are superimposed upon each other, as illustrated schematically in FIG. 1.

Figure 5:
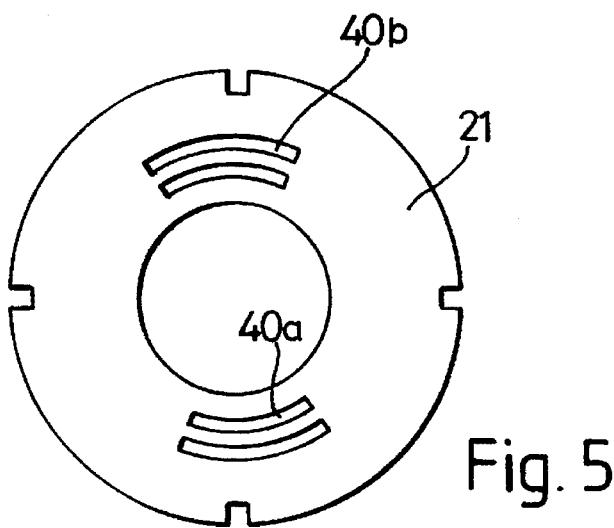
FIG. 5 shows a collimater.

FIG. 5 shows the LED light source collimator 21 which comprises a plate having an angularly spaced pair of outer and inner collimating apertures 40a and 40b each pair of which registers with respective ones of the LED's 20. The collimator plate has notches in its outer periphery which assist in locating the collimator relative to the member 33.

Each detector unit 28a and 28b comprises an inner track photodiode detector 42 and an outer track photodiode detector 43 (schematically shown in FIG. 1).

The detector collimator 29 is substantially the same as the source collimator, and the apertures 40a and 40b of each of the collimating plates are aligned. The collimator apertures 40a and 40b are arranged to have radial dimensions similar to those of the apertures 39, 39', 40, 40' in the rotating masks 24, 26 but the circumferential dimension of the collimator apertures is an integral multiple of the aperture pitch on the rotating masks 24, 26.

Figure 6:
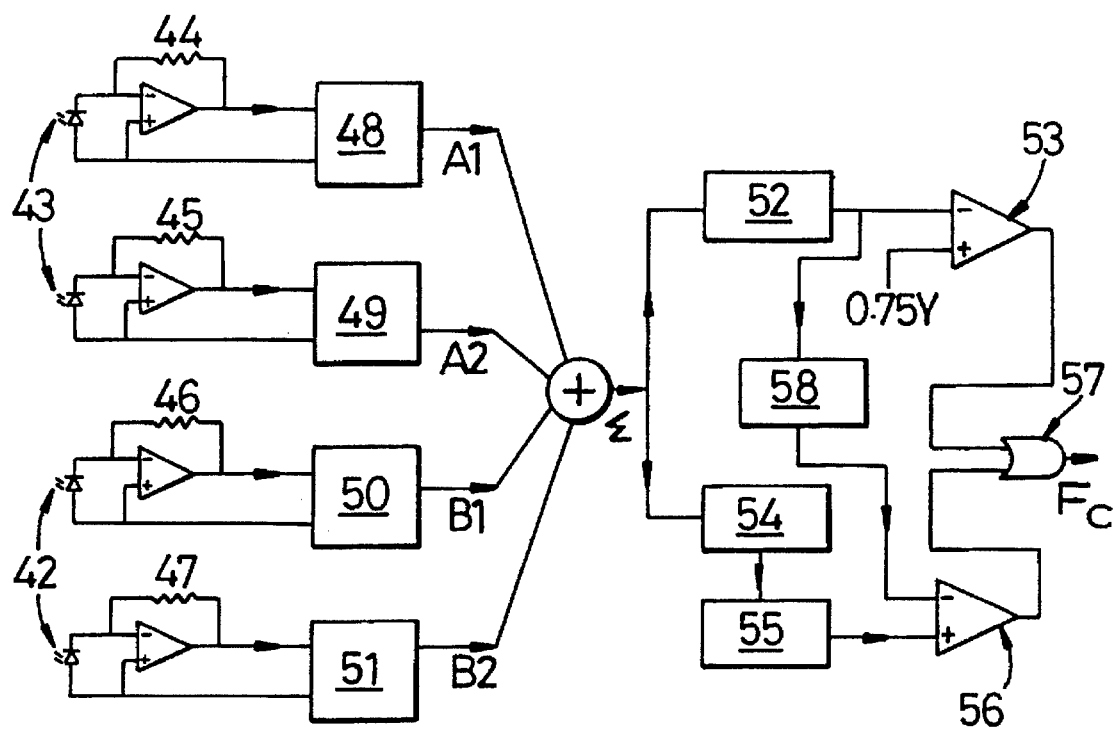
FIG. 6 shows a block diagram which can be used to monitor the sum of the signals from first and second receiver means of the sensor.

FIG. 6 shows a block diagram illustrating the kind of signal processing system which can be used to monitor the sum of the detector output signals. The signal from each of the two outer track photodetectors 43 and the signals from each of the inner track photodetectors 42 are each amplified by a respective amplifier circuit 44, 45, 46, 47, the amplified signals then being input to respective analogue to digital signal converters 48, 49, 50, 51 incorporated in an ECU microprocessor. The resultant four digital signals comprising the two signals A1 and A2 originating from the two outer track detectors, and the two signals B1 and B2 originating from the two inner track detects, are input to an adding circuit which produces the sum signal, Σ=(A1+A2+B1+B2).

In an alternative embodiment, a single multiplexer is used to input the amplified signals to a single analogue to digital convertor and a suitable microprocessor is used to produce the sum signal (A1+A2+B1+B2).

in a further alternative embodiment the detector units 28a and 28b each comprise two pairs of photodiode detectors, and electrical system of FIG. 6 is modified to receive light detect output signals.

As an example it is assumed that the sum signal during normal operation at the start of the torque sensor life is Y. The sum signal is passed through a low-pass filter 52 which passes frequencies below, for example, 0.001 Hz. This removes any ripple present on the sum signal to leave a steady signal, which will only vary due to slow ageing and degradation of the sensor. This steady signal is compared with a reference signal, in this example 0.75 Y, using a comparator 53, and if it falls below the reference signal level, a signal denoting a fault is generated.

The sum signal is also passed through a high pass filter 54, which is arranged to pass frequencies higher than, for example, 0.001 Hz. The signal from this filter is the ripple present on the sum signal, with the low frequency drift due to ageing removed. This signal is then passed through a peak-to-peak detector 55 to measure the ripple amplitude, and compared with a preset level using a comparator 56. This preset level is conveniently derived by multiplying the output from the low-pass filter 52 by a constant, which may be, for example, 0.2, as represented by reference 58 in FIG. 6. If the ripple amplitude increases to more than 0.2 of the average (low-pass filtered) level, a signal denoting a fault is generated.

The two fault signals can be combined with an OR-gate 57 to give a combined fault signal, Fc.

When a fault signal, Fc, is generated, the ECU disables the power-assistance in the steering system until the sensor is replaced or repaired.

Figure 7A:
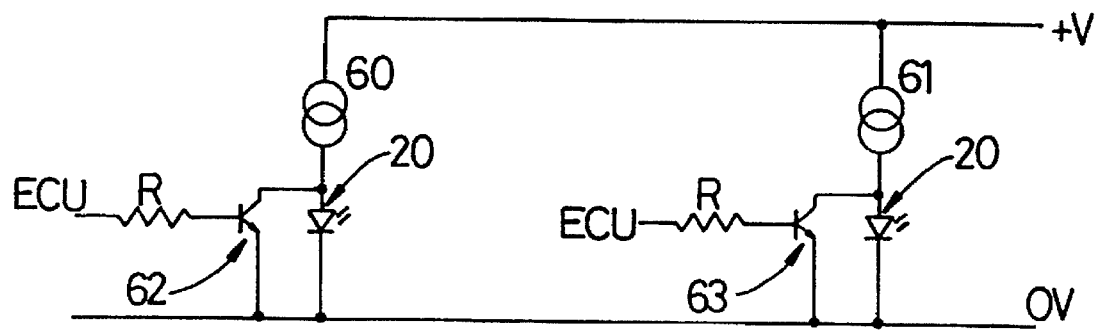
FIG. 7a shows a circuit diagram which can be used to control activation of emitter means of the sensor.

The circuit shown in FIG. 7a illustrates the kind of electrical system which may be incorporated in the ECU to enable the ECU to activate the two LEDs individually at system switch on or system switch off. A positive voltage +V is applied to each of the LEDs 20, both of the LEDs being in series with respective current sources 60 and 61. As shown in FIG. 7a, each LED is in parallel with a respective transistor 62, 63. By sending a logic signal representing the logic value unity through a resistor R in the base of either of the transistors the respective LED is activated to its OFF state in which no light is emitted from the LED. Sending a logic value of zero through the base resistor R of either transistor returns or retains the respective LED in its ON state in which light is emitted. As each device illuminates, a signal will be produced at one or more of the detectors. If none of the detectors receives a signal when a particular LED is activated, then that LED can be deemed to be faulty.

Figure 7B:
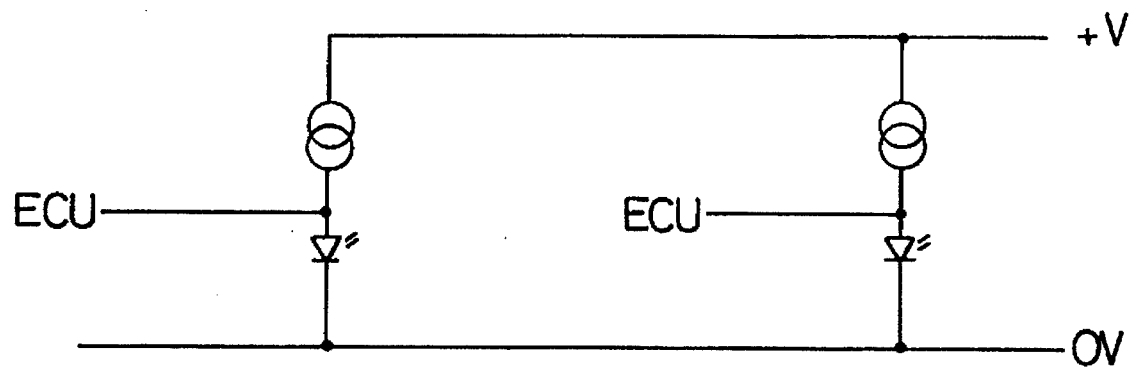
FIG. 7b shows a circuit diagram which can be used to monitor the voltage across the emitter means.

Additionally, the circuit of FIG. 7b shows how the voltage across the LEDs may be monitored. The LEDs each have a positive voltage +V applied to them, and a current source in series, as in the circuit of FIG. 7a. The ECU monitors the voltage across each LED. If this voltage varies from a predetermined normal operation value the ECU may generate a fault signal.

Figure 8:
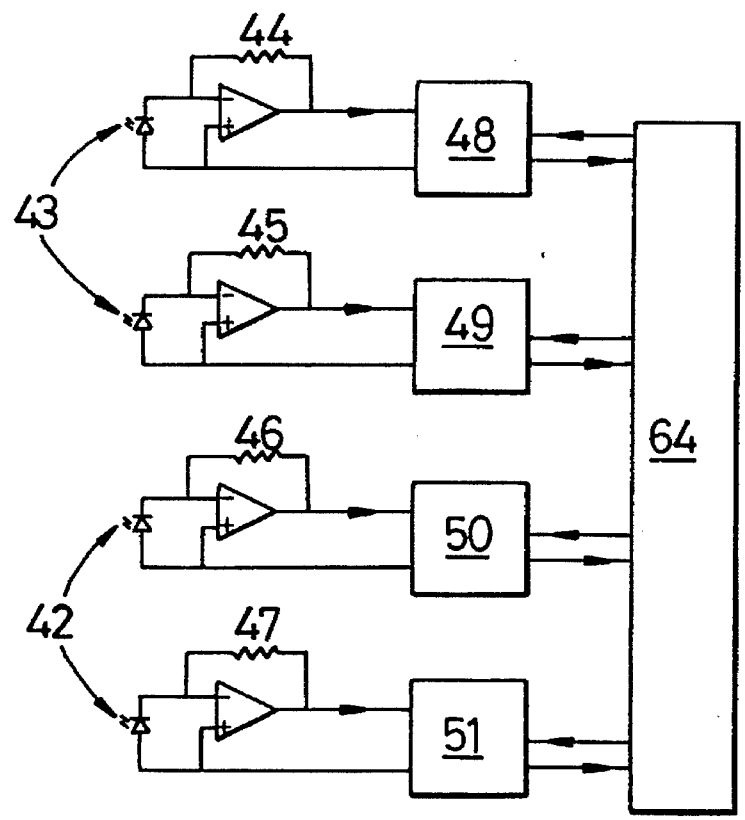
FIG. 8 shows a block diagram which can be used to control operation of the first and second receiver means.

The block diagram of FIG. 8 shows how the two pairs of photodetectors 42 and 43 are connected to the analogue to digital converters 48, 49, 50, 51 as in FIG. 6. (As aforementioned, the convertors 48, 49, 50 and 51 may be replaced by a multiplexer and a single A/D convertor.) FIG. 8 also shows how the ECU microprocessor 64 is arranged to receive the output signals from the convertors 48, 49, 50, 51, and to control the four photodetectors through these converters. The ECU may control each of the detectors individually at system "switch-on" and/or system "switch-off" so that each detector can be tested for failure. Should one of the detectors fail to produce a signal when the two LEDs are activated to their ON state then this detector is deemed to be faulty by the ECU.

In the alternative embodiment incorporating light photodetectors, the ECU is adapted to similarly control each of the light detectors individually at system "switch-on" and/or system "switch-off".

Figure 9:
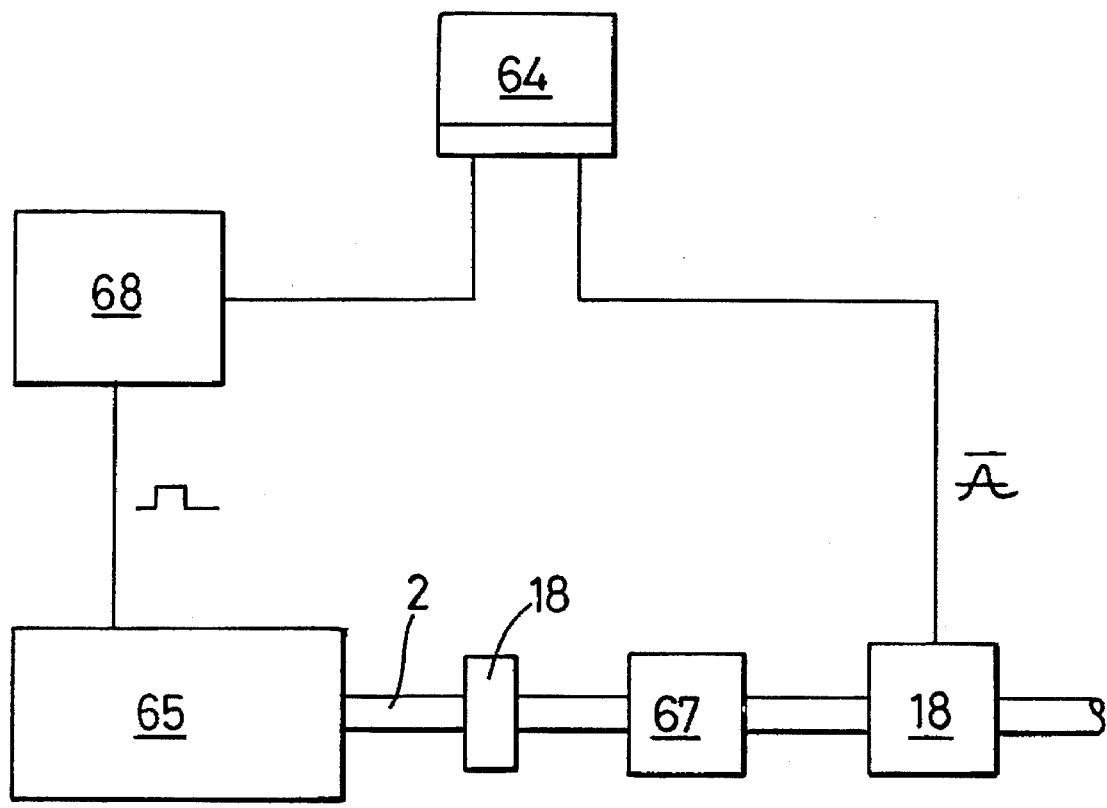
FIG. 9 shows a block diagram of a power assisted steering system incorporating a torque sensor and system failure diagnostics.

The ECU can also be operated to generate a single pulse which momentarily activates the electric motor of the power-assisted steering system when the sensor is switched on. As shown schematically in FIG. 9, the motor 65 is attached to the steering shaft 5. A clutch 66, a gearbox 67 and the torque sensor 18 are also attached to the steering shaft 2. The ECU sends the generated pulse through a motor controller 68 to the motor 65. The output signal from the torque sensor is input to the ECU, following the generation of a pulse, and if the signal falls outside a present range of threshold values the ECU generates a fault signal, indicating failure of one of the clutch, the gearbox or the torque sensor. This system can thus detect, for example, seizure of the gearbox, or failure of one of the opto electronic components of the torque sensor.

This pulse activation of the motor also enables problems arising from the steering shaft being positioned such that one detector is totally obscured to be overcome. If the shaft is moved by at least one-half of an aperture pitch then this will ensure that every photodiode is uncovered during at least part of the movement, which will enable all the detectors to be checked. This could also provide a way of testing the motor and clutch (if fitted) before each journey.

I claim:

1. A torque sensor comprising an input member, an output member, emitter means, first receiver means for receiving a first signal and producing a first output signal, second receiver means for receiving a second signal and producing a second output signal, the output signals from the receiver means being dependent upon the first and second signals which they receive, and signal processing means for receiving said output signals and processing said output signals from the first and second receiver means so as to produce a modified output signal indicative of the relative angular displacement between, or torque applied between, the input and output members, wherein diagnostic means is provided for continuously monitoring a sum signal $\Sigma$ comprising the sum of the output signals from the first and second receiver means, the diagnostic means comprising a low pass filtering means through which said sum signal $\Sigma$ is passed to produce a steady signal and said diagnostic means further comprises a comparator means which compares said steady signal to a reference signal in order to detect variation in the sum signal due to the failure of the sensor.

2. A torque sensor according to claim 1, in which the diagnostic means comprises signal processing means.

3. A torque sensor according to claim 2, in which the signal processing means comprises an electronic control unit incorporating a digital microprocessor.

4. A torque sensor according to claim 3, further comprising a plurality of analog to digital converters for respectively converting each of the output signals from the first and second receiver means from an analog signal to a digital signal, and wherein the microprocessor sums all the output signals from the converters to produce the sum signal $\Sigma$ to be monitored.

5. A torque sensor according to claim 3, further comprising a multiplexer to multiplex the output signals from the first and second receiver means to a single analog to digital converter, and wherein the microprocessor is for summing all the output signals from the converter to produce the sum signal $\Sigma$ to be monitored.

6. A torque sensor according to claim 3, in which the digital microprocessor comprises a high-pass filter through which the sum signal is passed in order to produce a signal representing any ripple present an the sum signal.

7. A torque sensor according to claim 6, in which the signal processing means comprises means for comparing the amplitude of the ripple with a preset value and for generating a fault signal if the amplitude is greater than the present value.

8. A torque sensor according to claim 2, in which the signal processing means comprises hard-wired analogue or digital circuitry.

9. A torque sensor according to claim 1 in which the signal processing means generates a fault signal if the value of the steady signal falls below the value of the preset reference signal.

10. A torque sensor according to claim 9, in which the signal processing means comprises means for combining the fault signals produced by the signal processing means so as to produce a combined fault signal Fc.

11. A power-assisted steering system comprising a torque sensor according to claim 1, an input column transmitting torque from a steering wheel to the input member of the torque sensor, and an output column transferring torque to a steering mechanism for steering road wheels of the system.

12. A power-assisted steering system according to claim 11, in which the diagnostic means of the torque sensor comprises means for disabling the power-assistance in the steering system if a fault signal is generated by the torque sensor.

13. A power-assisted steering system according to claim 11, in which the diagnostic means of the torque sensor comprises means for testing any one of the emitter means and the first and second receiver means for failure when the sensor is switched on and/or when the sensor is switched off.

14. A power-assisted steering system according to claim 13, in which the emitter means comprises a plurality of effective emitters and the diagnostic means of the torque sensor enables each effective emitter to be activated individually when the sensor is switched on and/or when the sensor is switched off and to generate a fault signal if no signal is received by either of the first and second receiver means when a single effective emitter is activated.

15. A power-assisted steering system according to claim 13, in which the first and second receiver means of the torque sensor each comprise a plurality of effective receivers and the diagnostic means further comprises means for activating briefly each effective receiver individually when the torque sensor is switched on and/or off, and to generate a fault signal if no signal is received by a particular activated one of the effective receivers when all the effective emitters are activated.

16. A power assisted steering system according to claim 15, an which the torque sensor further comprises signal varying means interposed between the emitter means and the first and second receiver means, and the single pulse is of sufficient strength to cause the output column of the steering system to rotate through a large enough angle to enable signals from the emitter means to pass through the signal varying means in order to reach each one of the effective receivers of the first and second receiver means.

17. A power-assisted steering system according to claim 13, further comprising a steering motor, a clutch and a gearbox, the motor, clutch, gearbox and torque sensor all being attached to the output column of the steering system such that the clutch and the gearbox are positioned between the motor and the torque sensor, and in which signal processing means is provided to generate a single pulse when the steering system is switched on and/or switched off which momentarily activates the steering motor of the steering system to cause the output column of the steering system to rotate in a first direction.

18. A power-assisted steering system according to claim 17, in which the diagnostic means of the torque sensor comprises means for monitoring the modified output signal from the torque sensor following generation of the single pulse and to generate a fault signal if the value of the modified output signal lies outside a preset range of values.

19. A power-assisted steering system according to claim 17, in which the signal processing means for generating the single pulse enables a further single pulse to be generated which momentarily activates the steering motor to cause the output column of the steering system to rotate in a second direction opposite the first direction.

* * * * *